INVENTORS.
ROY E. MURPHY &
JOHN PETER WEIL
BY
their ATTORNEYS

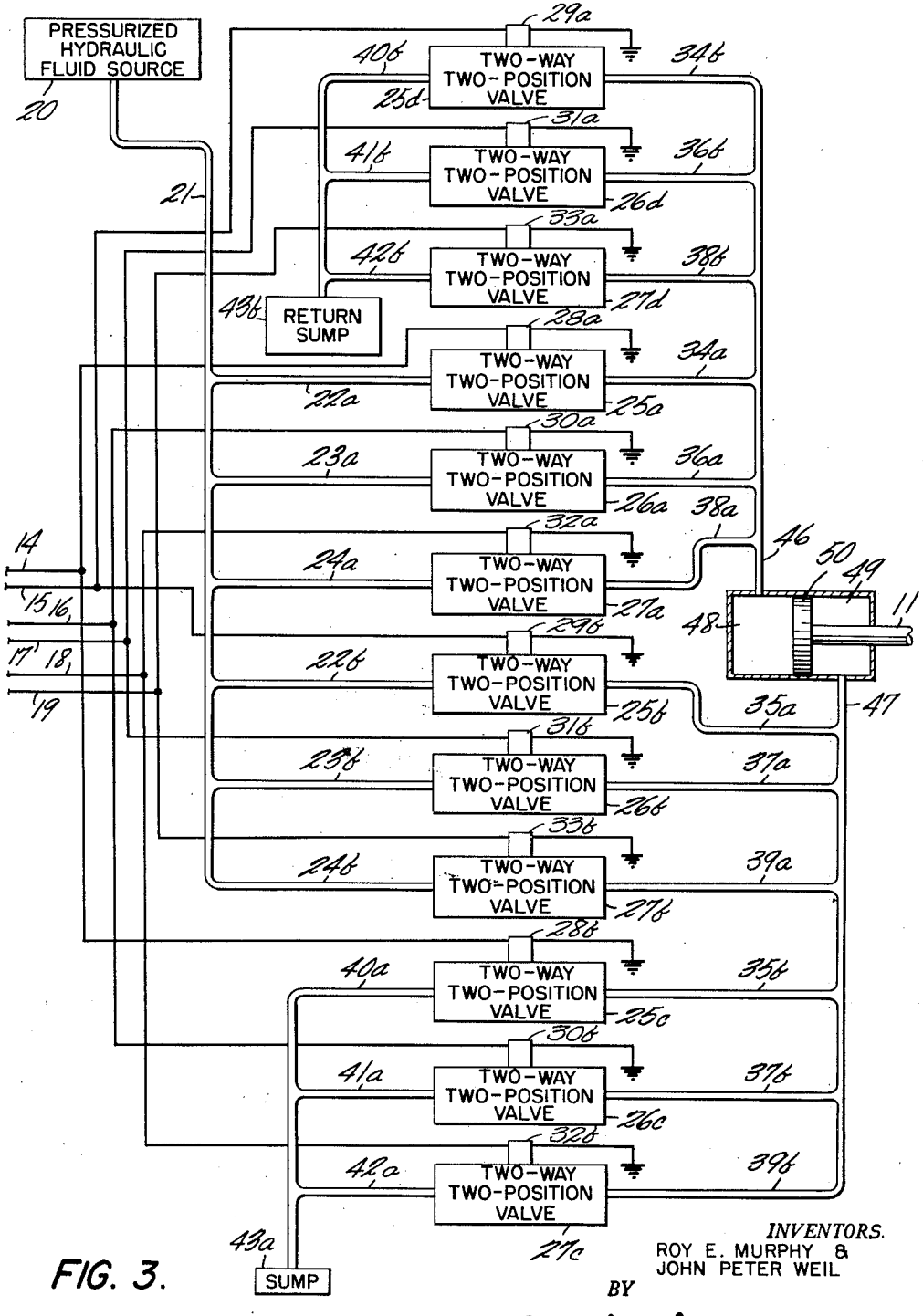

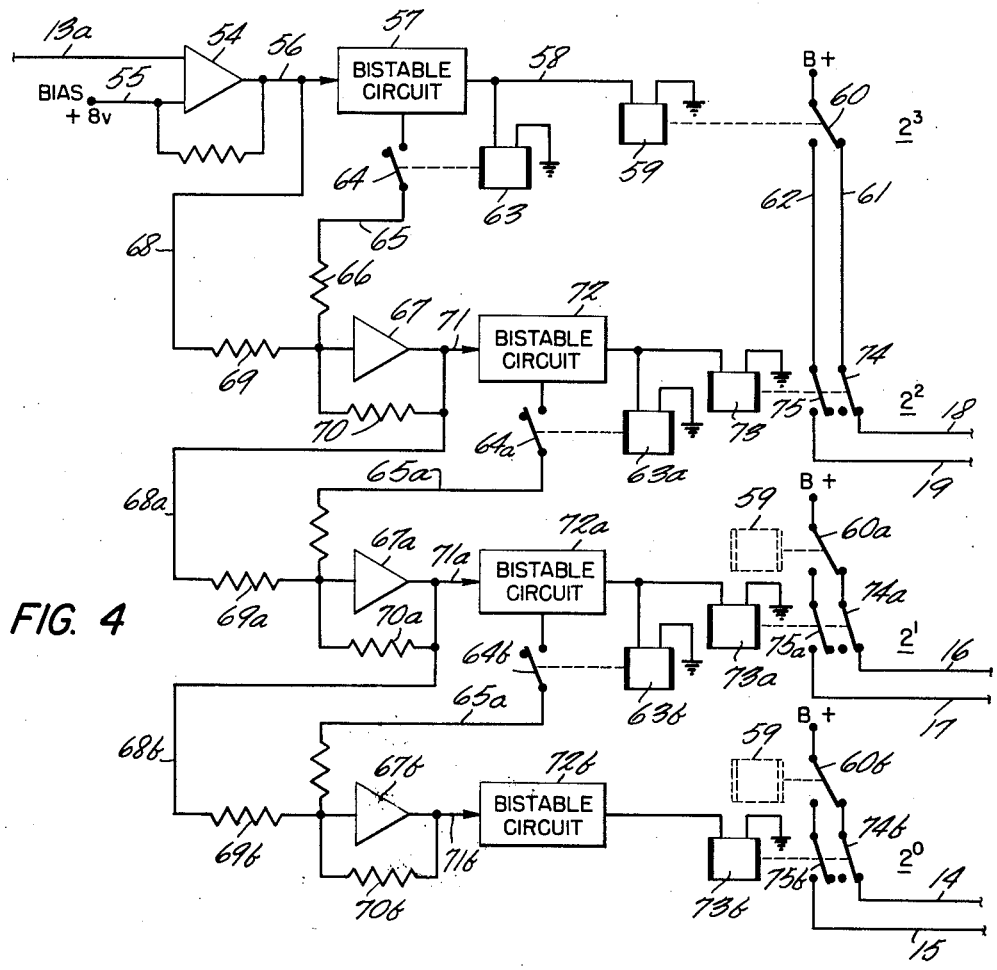
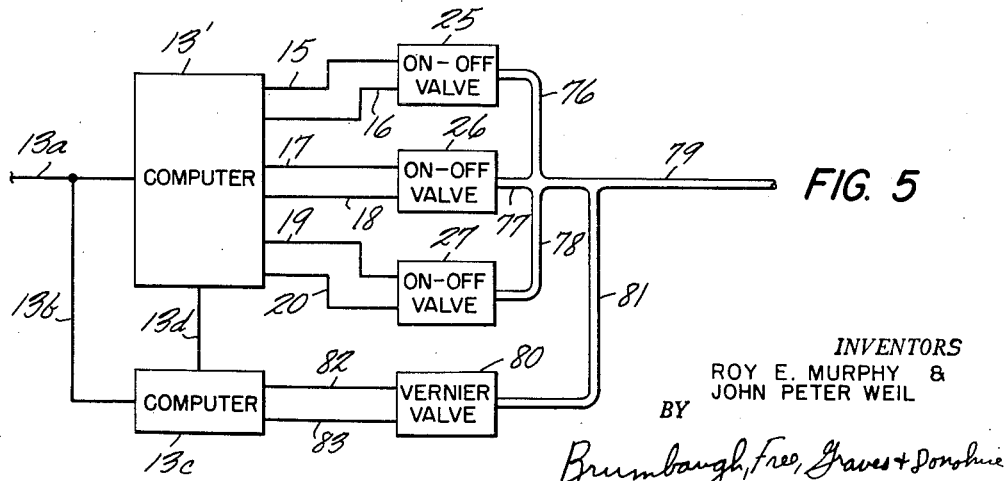

United States Patent Office 3,038,449
Patented June 12, 1962

3,038,449
HYDRAULIC CONTROL SYSTEM
Roy E. Murphy, Jr., Palo Alto, Calif., and John Peter Weil, Hicksville, N.Y., assignors to General Dynamics Corporation, New York, N.Y., a corporation of Delaware
Filed June 3, 1959, Ser. No. 817,908
6 Claims. (Cl. 121—38)

This invention relates to pressurized fluid flow control and, in particular, to hydraulic apparatus including a controlled group of valves to supply fluid at selected flow rates.

In positioning a driven member in accordance with input signals of varying magnitude, hydraulic drives are often preferable to electrical and other type units because of their high torque to inertia ratio, high horsepower rating per unit size and weight, and ease of cooling which enables their use at high ambient temperatures.

Hydraulic drives are especially useful in those instances where it is desirable to drive a member to a selected position at a high velocity in response to high amplitude input signals and at slower velocity in response to lower amplitude input signals. In highly accurate hydraulic systems close control of fluid flow is required and it has been found that small particles in the fluid cause excessive wear and decrease the operating life of the hydraulic components.

In particular, the use in fluid control systems of precision hydraulic proportional valves; i.e., valves designed to pass desired quantities of fluid from no flow to a maximum flow through a continuously variable flow port, requires hydraulic fluid free of particles as small as 10 microns in diameter. Such proportional valves also tend to vary unpredictably in their operation as a result of operating temperatures encountered which, together with their relatively fragile construction and high cost, make them the component most likely to give difficulty and require repeated servicing and replacement in hydraulic systems.

Furthermore, in systems utilizing feedback, otherwise termed hydraulic loops, signals representative of the position of the output member are used to modify the input signal until the driven member reaches a selected position at which time hydraulic flow is terminated. Initial rapid positioning of the driven member calls for high flow rates while subsequent slow positioning, as the driven member approaches the desired postion, calls for low flow rates of hydraulic fluid. Proportional valves ordinarily have been used in such hydraulic systems even though subject to the difficulties discussed heretofore.

The present invention provides fluid control apparatus replacing conventional high flow rate proportional valves but retaining, nevertheless, the advantages of variable flow. In particular, a group of fluid control valves of the simple on-off type, each having a different flow rating, are connected to deliver fluid in parallel. Preferably a series of valves is used each of which has a flow rating double that of the preceding valve in the series. Computer circuits respond to input signals to operate one or more of the parallel connected valves selectively to provide desired fluid flow rates to position a driven member.

A parallel combination of valves in accordance with the invention provides a number of flows selected by the computer greater than the number of valves and, in the preferred embodiment of the invention, $2^{n+1}-1$ different flows where $n$ is the number of valve means used, the valve means each including a supply and return valve.

In another embodiment of the invention, a simplified proportional valve, having a maximum capacity equal to the flow rating of the smallest on-off valve, is connected to supply high pressure fluid in parallel with the on-off valves. The proportional valve acts as a vernier over the range of the step flows provided by the on-off valves.

These and further advantages of the invention will be more readily understood when the following description is read in connection with the accompanying drawings, in which:

FIGURE 3 illustrates the substitution in the system of FIGURE 1 of two-way two-position valves for the four-way three-position valves used therein;

FIGURE 4 is a schematic circuit diagram of an illustrative computer that may be used to control the valves of FIGURES 1 and 3; and FIGURE 5 is a schematic diagram of a modified hydraulic system embodying the present invention.

Figure 1:
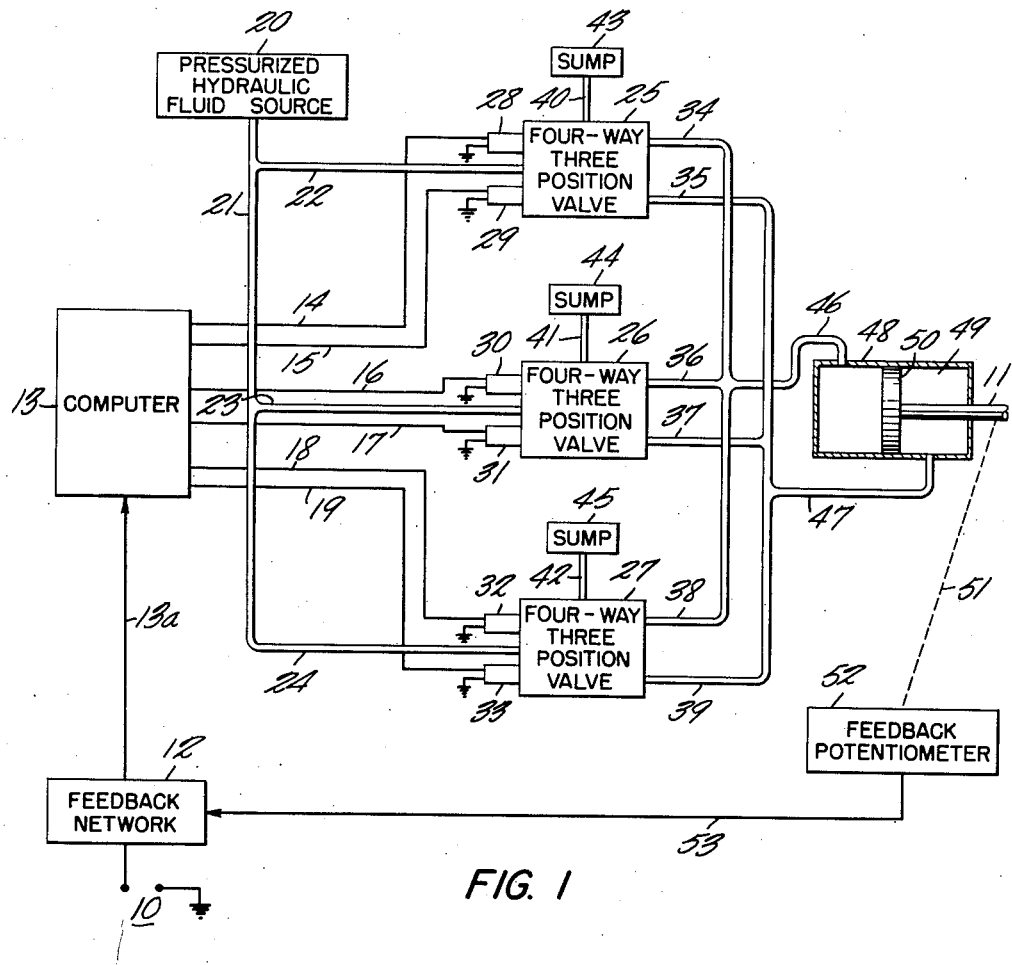
FIGURE 1 is a schematic diagram, partially in block form, of a hydraulic system embodying the principles of the present invention.

Referring to a typical hydraulic system in accordance with the principles of the invention in greater detail with particular reference to FIGURE 1, a hydraulic system incorporating a feedback loop to control hydraulic fluid flow to a driven member is illustrated. However, it should be understood that the inventive principles are equally applicable to any system with or without feedback requiring variable fluid flow rates.

In FIGURE 1 input terminals 10 receive electrical signals to position a driven member 11. Such input signals are applied through a feedback summing network work 12 and line 13a to a computer 13 supplying, in this instance, three separate outputs on conductors 14—15, 16—17, and 18—19. An illustrative computer circuit will be described hereinafter with reference to FIGURE 4.

To drive and position the member 11, a source of pressurized hydraulic fluid 20 is coupled by hydraulic lines 21, 22, 23 and 24 to three four-way three-position valve means or valves 25, 26 and 27 having different flow rates. A pair of solenoids 28—29, 30—31 and 32—33 operate each of the valves 25, 26 and 27, respectively, to control the flow of hydraulic fluid therethrough to corresponding hydraulic supply and return lines 34—35, 36—37 and 38—39. Further hydraulic lines 40, 41 and 42 direct return fluid to sumps 43, 44 and 45 from the valves 25, 26 and 27, respectively.

Figure 2:
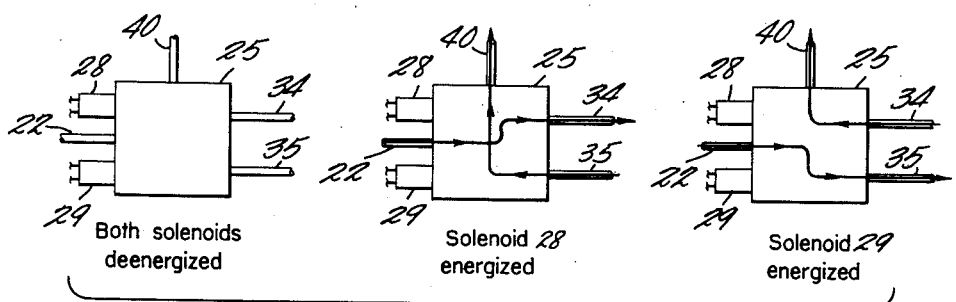
FIGURE 2 illustrates schematically the three operating positions of four-way solenoid valves shown in FIGURE 1.

The three operative positions of one of the four-way valves of FIGURE 1 are illustrated diagrammatically in FIGURE 2. With both of the solenoids 28 and 29 de-energized, no hydraulic fluid flows from the input line 22 through the valve 25 to the lines 34 and 35. If the solenoid 28 is then energized, the valve is operated to supply hydraulic fluid from the high pressure line 22 to the output line 34, as indicated by the arrow in the direction of flow, and the hydraulic fluid returns to the sump 43 through the line 35, the valve 25 and the line 40.

With the solenoid 29 energized, fluid flows from the input line 22 through the output line 35, as indicated by the arrow in the direction of flow, and back through the line 34, the valve 25 and the line 40 to the sump 43.

Returning to FIGURE 1, hydraulic fluid controlled by the valves 25, 26 and 27 is delivered additively in parallel to master lines 46 or 47 which communicate with chambers 48 and 49 on opposite sides of a piston 50 attached to the driven member 11. Accordingly, fluid flowing through the valves 25, 26 and 27 effectively drives the piston 50 in a desired direction and at a desired speed, the latter being dependent on the combined flow rate of the open valves.

A mechanical linkage 51 couples movement of the driven member 11 to a conventional feedback potentiometer 52 arranged to generate and supply position representative signals on a line 53. The feedback signals modify the input signals in the feedback network 12. As the driven member 11 is positioned by the hydraulic system, the feedback signals reduce the magnitude of the input signals until the resultant signal supplied to the computer 13 arrives at a predetermined value to terminate hydraulic flow through the valves 25, 26 and 27.

In many previous variable flow rate hydraulic systems used to position driven members, a proportional valve controlled the flow of hydraulic fluid. Input signals calling for large displacements of the driven member required a high fluid flow rate and a correspondingly large proportional valve opening. Therefore, it was necessary to provide a complex valve proving variable flows from zero to at least several gallons per minute to position the member. Small particles in the hydraulic fluid interfered with the operation of those valves and decreased their operating life substantially. Moreover, the tendency of such proportional valves to leak fluid, even when substantially fully closed, also gave rise to operating difficulties.

In contrast, the present invention uses simple on-off valves and yet provides for any desired number of different hydraulic flow rates to facilitate both rapid and slow positioning of a driven member. For example, the three valves 25, 26 and 27 are effective to provide 15 ($2^{n+1}-1$ where $n$ is the number of valves) different flow rates including seven in one direction, seven in the opposite direction and no flow.

As a specific example to illustrate the broad range of fluid flow control provided by the three valves 25, 26 and 27, assume that each valve is chosen to provide a flow rate double the flow rate of the preceding valve and the lowest capacity valve 25 has a flow rating of one gallon per minute. Then the valve 26 will have a flow rating of two gallons per minute and the valve 27 a flow rating of four gallons per minute. With solenoid 28 energized, valve 25 directs a one gallon per minute flow to the line 46 to cause slow movement of the driven member 11 to the right. If more rapid movement is called for by the input signals, solenoid 30 operates and solenoid 28 is deenergized to provide a flow of two gallons per minute. Further, solenoids 28 and 30 may be energized to provide a three gallon per minute flow, solenoid 32 may be energized to provide a four gallon per minute flow, and other combinations of the solenoids 28, 30 and 32 may be selectively operated to provide flow rates up to seven gallons per minute in steps of one gallon per minute. Similar flows of hydraulic fluid to the line 47 to drive the member 11 to the left may be obtained by suitable operation of the solenoids 29, 31 and 33.

Equal steps of fluid flow rates will be obtained if each succeeding valve of the group of valves connected to deliver fluid in parallel is double the capacity of the preceding valve of the group. However, the flow of fluid may be regulated over a wide range if each on-off valve has a flow rating differing from other valves in the group.

Instead of using four-way three-position on-off valve means of different flow capacities, as shown in FIGURE 1, two-way two-position on-off valves of different flow ratings may be connected to provide a series of valve means to deliver fluid in parallel to a driven member. Referring to FIGURE 3, in which elements corresponding to those of FIGURE 1 have been designated by similar reference numerals, the pressurized hydraulic fluid source 20 communicates through lines 21, 22a, 23a and 24a with valves 25a, 26a and 27a, which control fluid flow selectively through lines 34a, 36a and 38a to the hydraulic line 46 to drive the piston 50 and member 11 to the right. Valves 25c, 26c and 27c function to direct the return flow of hydraulic fluid from the line 47 through lines 35b, 37b and 39b and lines 40a, 41a and 42a, to sump 43a.

In like manner, to drive the member 11 to the left, valves 25b, 26b and 27b deliver fluid from lines 22b, 23b and 24b through lines 35a, 37a and 39a to the line 47 and the chamber 49. Valves 25d, 26d and 27d direct return fluid flow from the chamber 48 through the line 46, lines 34b, 36b and 38b, and lines 40b, 41b and 42b to sump 43b.

The output signals on the lines 14—15, 16—17 and 18—19 control, through suitable conductors, solenoids 28a—28b, 29a—29b and the remaining solenoids corresponding to those found in FIGURE 1 to drive the member 11 at varying speeds in either direction in accordance with applied signals.

The computer 13 of FIGURE 1 is a logical circuit that converts analog signals received on line 13a to binary (on-off) digital signals, and supplies such on-off output signals to the conductors 14—15, 16—17 and 18—19 to control the valves 25, 26 and 27 of different capacities in accordance with the analog signals. If a digital input is available, all that is necessary are logical circuits to provide binary coded signals directed to the proper output leads 14—15, 16—17 and 18—19.

An exemplary form of the computer 13 is shown in FIGURE 4. Input signals on the line 13a are supplied to an amplifier 54, biased positively in this particular instance through a conductor 55, to supply the bias voltage on an output lead 56 when the input signal is zero. Positive input signals add to the bias voltage and negative signals subtract therefrom. The output on line 56 is supplied to a bistable circuit 57 designed to operate when the input signal rises above a fixed reference or threshold voltage and to return to its initial state when the signal falls to or below the reference. For example, a cathode-coupled binary circuit, known as the Schmitt circuit, described fully on pages 164 to 172 of the text "Pulse and Digital Circuits" by Millman and Taub, published in 1956 by McGraw-Hill Book Company, Inc., may be used in the computer 13.

When the circuit 57 operates, it energizes through line 58 a relatively slow relay 59 having an armature 60 normally supplying positive voltage to a conductor 61. Switching of the armature 60 supplies positive voltage to another conductor 62.

Operation of the bistable circuit 57 also energizes a fast acting relay 63 which, in picking up its armature 64, completes a circuit from the bistable 57 through a conductor 65 and a resistor 66 to the input of an operational amplifier 67. The input of the bistable 57 is also coupled by a line 68 and a resistor 69 to the amplifier 67. Since feedback resistor 70 of the amplifier 67 has a value double that of each of the resistors 66 and 69, signals at the input of the amplifier 67 are doubled on its output line 71.

Output signals from the amplifier 67 are furnished to the input of another bistable circuit 72 controlling a fast acting relay 73 with its armatures 74 and 75 respectively joined to the conductors 61 and 62. With the relay 73 deenergized the armature 74 engages the output conductor 18 and operation of the armatures 74 and 75 results in engagement of the armature 75 with the output conductor 19.

The channels designated $2^1$ and $2^0$ controlling energization of the output leads 16—17 and 14—15, respectively, incorporate elements identical to those described in connection with the described $2^2$ channel and are designated by suffixes $a$ and $b$, respectively.

In an exemplary operation of the circuit of FIGURE 4, assuming that the amplifier 54 is biased 8 volts positive and supplies a +8 volt output with zero input signal, and further assuming that a fixed threshold voltage of 8 volts must be overcome to operate the bistable circuits 57, 72, 72a and 72b, an input signal of +5 volts on the lead 13a results in a signal of +13 volts on the conductor 56. Accordingly, the bistable 57 switches resulting in energization of the slow relay 59 and slightly delayed operation of the armature 60, 60a and 60b. The relay 63 also operates to couple from the circuit 57 to the input of the amplifier 67 a signal of −8 volts. The −8 volt and +13 volt signals combine to provide a +5 volt potential that is doubled in the amplifier 67. The resulting +10 volt signal on the output lead 71 fires the bistable circuit 72, since it exceeds the 8 volt reference or threshold level, which energizes the relays 73 and 63a.

The relay 73 picks up its armatures 74 and 75 to energize, upon closure of the slow acting relay 59, the output lead 19. The relay 63a also picks up its armature 64a to furnish −8 volts to the input of the amplifier 67a which, when combined with the 10 volt signal on the conductor 68a, results in a +2 volt input amplified to a +4 volt level on the bistable input conductor 71a. Such 4 volt input is not sufficient to overcome the 8 volt threshold level of the bistable 72a so that it does not fire, the relays 73a and 63b remain deenergized, and the output lead 17 is not energized when the relay armature 60a is operated by the slow acting relay 59.

The +4 volt signal is supplied through lead 68b and amplifier 67b to furnish a +8 volt potential on the line 71b equaling the threshold level of 8 volts. Therefore the bistable 72b does not operate and the output lead 15 is not subsequently energized.

Accordingly, in response to a +5 volt signal, the output line 19 energizes the solenoid 33 on the valve 27 to supply hydraulic fluid at 4 gallons per minute through the lines 39 and 47 to drive the piston 50 and movable member 11 to the left. Such movement reduces the feedback signal on the line 53 and the input signal on the line 13a. The logical computer 13 responds by supplying signals closing the valve 27 and opening the valves 25 and 26 to provide a 3 gallon per minute flow of hydraulic fluid, then supplies signals closing the valve 25, and finally provides signals closing the valve 26 and reopening the low capacity valve 25 until the input signal on the line 13a becomes zero, at which time all of the valves are closed and the member 11 is properly located.

From the foregoing it will be apparent that there are a number of discrete flow rates furnished by the parallel connected valves 25, 26 and 27 to the hydraulic chambers 48 and 49. The number of steps can be increased as desired by increasing the number of valves.

Assuming next that the driven member 11 must be moved to the right, it is apparent that the flow of fluid in the hydraulic lines must be reversed. The computer circuits shown in FIGURE 4 operate when energized by negative voltages on the input lead 13a to control the valves 25, 26 and 27 and provide such reverse fluid flow.

In particular, assuming a signal of −2 volts on the conductor 13a, the output on the line 56 is +6 volts, insufficient to overcome the 8 volt threshold and fire the bistable 57. Accordingly, the armatures 60, 60a and 60b remain in their normally closed positions. The +6 volt signal is doubled by the amplifier 67 and the resulting +12 volt potential operates the bistable 72 which picks up the relays 73 and 63a. The −8 volt signal on the line 65a reduces the +12 volt signal on the line 68a to +4 volts which, after being doubled by the circuit 67a, fails to exceed the threshold value of the bitsable 72a. The +8 volt signal supplied on the line 68b to the amplifier 67b is doubled and fires the bistable 72b to operate the relay 73b.

Since the armatures 74, 74a and 74b are normally closed, their above-described operation in accordance with the binary number 101 provides the same output on the lines 14, 16 and 18 as provided on the lines 15, 17 and 19 by operation of the normally open relays 75, 75a and 75b by the binary number 010. In other words, the line 16 is energized as a result of the −2 volt signal on the line 13a and the solenoid 30 operates to cause 2 gallons per minute fluid flow through the lines 36, 46, 47 and 37 to drive the member 11 to the right.

The channel including the bistable 57 and relay 59, termed the $2^3$ channel, controls operation of the armatures 60, 60a and 60b to determine whether direct binary numbers (negative signals) or complement binary numbers (positive signals) will be provided by the computer 13 in response to input signals. Considering the binary numbers and the corresponding gallons per minute flow through the valves, assuming flow rates of 1, 2 and 4 gallons per minute for the valves 25, 26 and 27:

Table 1

| Input Signal, Volts | Binary Number | Output Flow, g.p.m. |
|---|---|---|
| 8 | 1111 | 7 |
| 7 | 1110 | 6 |
| 6 | 1101 | 5 |
| 5 | 1100 | 4 |
| 4 | 1011 | 3 |
| 3 | 1010 | 2 |
| 2 | 1001 | 1 |
| 1 | 1000 | 0 |
| 0 | 0111 | 0 |
| −1 | 0110 | −1 |
| −2 | 0101 | −2 |
| −3 | 0100 | −3 |
| −4 | 0011 | −4 |
| −5 | 0010 | −5 |
| −6 | 0001 | −6 |
| −7 | 0000 | −7 |

From the foregoing it is apparent that the polarity of the input signal determines the direction of movement of the driven member 11 by means of the $2^3$ channel. This is indicated in the following table showing the relationship between two groups of binary numbers:

Table 2

| Direct | Complements |
|---|---|
| 0 0000 | 15 1111 |
| 1 0001 | 14 1110 |
| 2 0010 | 13 1101 |
| 3 0011 | 12 1100 |
| 4 0100 | 11 1011 |
| 5 0101 | 10 1010 |
| 6 0110 | 9 1001 |
| 7 0111 | 8 1000 |

From Table 2 is will be noted that the binary quantity representative of numbers 6 and 9, 5 and 10, 4 and 11, etc. are complements. By using the relay 59 and armatures 60, 60a and 60b to switch from direct to complement in accordance with the $2^3$ channel, the eight possible flow rates (including zero flow) obtainable by various combinations of the three different capacity valves 25, 26 and 27 may be supplied to a driven member.

A particular form of electro-mechanical computer responding to analog signals to provide a binary output controlling different capacity valves has been described in connection with FIGURE 4. However, it will be apparent that an electronic computer may be substituted for the unit shown in FIGURE 4 to provide analog to digital conversion. For example, the analog to digital computers illustrated in U.S. Patents Nos. 2,616,965 and 2,715,724, and other known computers, may be used to convert analog information to binary information.

To provide essentially stepless variable fluid flow to a driven member, the principles of the present invention are embodied in the fluid control system shown diagrammatically in FIGURE 5. The valves 25, 26 and 27 supply fluid through lines 76, 77 and 78 to an output line 79. A vernier valve 80 is also connected to supply fluid through a line 81 to the output line 79.

The valves 25, 26 and 27 are controlled by a computer 13′, similar to the computer 13 discussed in detail heretofore, through the conductors 15—16, 17—18 and 19—20 in response to signals on the input line 13a. In addition, an input line 13b leads to a further computer 13c controlling through conductors 82 and 83 the vernier valve 80, and a connecting line 13b between the computer 13′ and 13c coordinates operation of the on-off valves 25, 26 and 27 with the vernier valve 80.

In operation, assuming flow ratings of 1, 2 and 4 gallons per minute for the valves 25, 26 and 27, respectively, and further assuming that the vernier valve 80 comprises a conventional proportional valve having a continuously variable range of 0 to 1 gallon per minute, in response to signals of increasing amplitude on the input line 13a, the computer 13c gradually opens the vernier valve 80 to supply fluid to the output line 79. If the valve 80 opens fully and the input signal increases further, the computers 13' and 13c cooperate to open the valve 25 and close the vernier valve 80 simultaneously. A further increase in the input signal causes the vernier valve 80 to open again until a flow of two gallons per minute is called for. At that time, the valves 25 and 80 are closed and the valve 26 opened. Similarly, when the signal on the input line 13a decreases, the vernier valve 80 gradually is closed within its one gallon per minute range between openings and closings of the on-off valves 25, 26 and 27.

The above-described typical fluid control systems embodying the principles of the present invention provide a wide range of fluid flows with a minimum number of simple hydraulic components. It will be understood that those embodiments of the invention are illustrative only and modifications thereof will occur to those skilled in the art. Therefore, the invention is not to be limited to the particular apparatus described herein but is to be defined by the appended claims.

We claim:

1. A hydraulic drive system comprising a hydraulic fluid driven member, a group of hydraulic on-off valve means each of which controls selectively two supply flow fluid circuits and two return flow fluid circuits therethrough, each valve means having a flow rating greater than that of the next lower capacity valve means in the group, a pair of master fluid lines coupled to the driven member, fluid conduits connecting the valve means in parallel to the master fluid lines, operating means controlling the valve means to open and close the supply and return fluid circuits selectively, computer means responsive to analog input signals to actuate the valve means operating means in accordance with binary output signals to provide through said supply and return fluid circuits separately and in combination a number of different flows greater than the number of valve means and up to $2^{n+1}-1$ where $n$ is the number of valve means to vary the position of the driven member at rates determined by the input signals.

2. Apparatus as defined in claim 1, wherein the group of valve means comprises a series of valve means in which each successive valve means has a flow rating double that of each of the preceding valve means in the series, and the number of different flow rates through said valve means is equal to $2^{n+1}-1$ where $n$ is the number of valve means.

3. Apparatus as defined in claim 1, wherein means responsive to the position of the driven member generates feedback signals representative of its instantaneous position, and means to modify the input analog signals in accordance with the position representative signals.

4. In a hydraulic fluid control system, a series of parallel connected on-off hydraulic valves adapted to be coupled to a pressurized fluid source, each successive valve having a flow rating greater than that of the preceding valve in the series, means to open and close each valve, a vernier proportional valve in parallel with the on-off valves, and computer means controlling the series of valves and the vernier valve to provide through said valves separately and in combination any flow rate from zero to the sum of the flow rates of all of said valves.

5. In a system providing a plurality of pressurized fluid flow rates, a group of on-off valve means each of which controls selectively two supply flow fluid circuits and two return flow fluid circuits therethrough, each of the valve means having a flow rating double that of the next lower capacity valve means in the group, a pair of master fluid lines, fluid conduits connecting the valve means in parallel to the master fluid lines, and means controlling the valve means selectively to open and close the supply and return fluid circuits and provide in the master fluid lines a number of different flow rates equal to $2^{n+1}-1$ where $n$ is the number of valve means.

6. Apparatus as defined in claim 5, wherein a vernier proportional valve means is connected in parallel with the group of on-off valve means, said on-off valve means controlling means also controlling said vernier valve means.

References Cited in the file of this patent

UNITED STATES PATENTS

| | | |
|---|---|---|
| 2,229,903 | Schmol et al. | Jan. 28, 1941 |
| 2,413,584 | Side | Dec. 31, 1946 |
| 2,437,109 | Maquat | Mar. 2, 1948 |
| 2,627,280 | Adelson | Feb. 3, 1953 |
| 2,777,285 | McDonald | Jan. 15, 1957 |
| 2,916,205 | Litz | Dec. 8, 1959 |
| 2,999,482 | Bower | Sept. 12, 1961 |